(12) United States Patent
Gerosa

(10) Patent No.: US 6,426,919 B1
(45) Date of Patent: Jul. 30, 2002

(54) PORTABLE AND HAND-HELD DEVICE FOR MAKING HUMANLY AUDIBLE SOUNDS RESPONSIVE TO THE DETECTING OF ULTRASONIC SOUNDS

(76) Inventor: William A. Gerosa, 12-6 Foxwood Dr., Pleasantville, NY (US) 10570

( * ) Notice: Subject to any disclaimer, the term of this patent is extended or adjusted under 35 U.S.C. 154(b) by 0 days.

(21) Appl. No.: 09/754,543

(22) Filed: Jan. 4, 2001

(51) Int. Cl.[7] ............................................. H04B 11/00
(52) U.S. Cl. ....................................................... 367/132
(58) Field of Search ................................ 367/132, 134, 367/135, 137

(56) References Cited

U.S. PATENT DOCUMENTS

| 4,039,999 | A | 8/1977 | Weston | |
|---|---|---|---|---|
| 4,821,326 | A | 4/1989 | MacLeod | 381/51 |
| 5,539,705 | A | 7/1996 | Akerman et al. | 367/132 |
| 5,661,699 | A | 8/1997 | Sutton | 367/132 |

FOREIGN PATENT DOCUMENTS

DE 29714812 U1 * 10/1997

* cited by examiner

Primary Examiner—Daniel T. Pihulic
(74) Attorney, Agent, or Firm—Richard L. Miller

(57) ABSTRACT

A portable and hand-held device for making humanly audible sounds responsive to the detecting of ultrasonic sounds. The device includes a hand-held housing and circuitry that is contained in the housing. The circuitry includes a microphone that receives the ultrasonic sound, a first low voltage audio power amplifier that strengthens the signal from the microphone, a second low voltage audio power amplifier that further strengthens the signal from the first low voltage audio power amplifier, a 7-stage ripple carry binary counter that lowers the frequency of the signal from the second low voltage audio power amplifier so as to be humanly audible, a third low voltage audio power amplifier that strengthens the signal from the 7-stage ripple carry binary counter, and a speaker that generates a humanly audible sound from the third low voltage audio power amplifier.

15 Claims, 1 Drawing Sheet

PORTABLE AND HAND-HELD DEVICE FOR MAKING HUMANLY AUDIBLE SOUNDS RESPONSIVE TO THE DETECTING OF ULTRASONIC SOUNDS

BACKGROUND OF THE INVENTION

1. Field of the Invention

The present invention relates to a portable and hand-held device. More particularly, the present invention relates to a portable and hand-held device for detecting ultrasonic sounds, and making humanly audible sounds responsive thereto.

2. Description of the Prior Art

Numerous innovations for communication systems have been provided in the prior art that will be described. Even though these innovations may be suitable for the specific individual purposes to which they address, however, they differ from the present invention.

A FIRST EXAMPLE, U.S. Pat. No. 4,039,999 to Weston teaches amplitude modulation systems for underwater communication having a number of disadvantages. For example, with a number of divers attempting to communicate simultaneously, intolerable cross-talk occurs. Variable tuning is necessary to overcome this problem. However, the invention disclosed herein uses angle modulation (phase or frequency modulation) which inherently has fewer noise problems and, because of the "capture effect" reduces any cross-talk problems. In an exemplary embodiment an audio transducer feeds a modulator to produce frequency modulated radio frequency signals which are fed to a balanced modulator together with a fixed frequency radio frequency signal from a local oscillator. The output of the balanced modulator comprises ultrasonic frequency signals which are frequency modulated in accordance with the audio signals. Also disclosed is a receiver for such ultrasonic frequency signals. By the use of integrated circuits, a combined ultrasonic transmitter and receiver may be provided in a compact unit adapted to be strapped on the head of a diver.

A SECOND EXAMPLE, U.S. Pat. No. 4,821,326 to MacLeod teaches a non-audible speech generation apparatus and method for producing non-audible speech signals which includes an ultrasonic transducer or vibrator for projecting a series of glottal shaped ultrasonic pulses to the vocal track of a speaker. The glottal pulses, in the approximate frequency spectrum extending from fifteen kilohertz to one hundred five kilohertz, contain harmonics of approximately 30 times the frequency of the acoustical harmonics generated by the vocal cords, but which may nevertheless be amplitude modulated to produce non-audible speech by the speaker's silently mouthing of words. The ultrasonic speech is then received by an ultrasonic detector disposed outside of the speaker's mouth and electrically communicated to a translation device which down converts the ultrasonic signals to corresponding signals in the audible frequency range and synthesizes the signals into artificial speech.

A THIRD EXAMPLE, U.S. Pat. No. 5,529,705 to Ackerman et al. teaches a wireless communication system that is undetectable by radio frequency methods for converting audio signals, including human voice, to electronic signals in the ultrasonic frequency range, transmitting the ultrasonic signal by way of acoustical pressure waves across a carrier medium, including gases, liquids, or solids, and reconverting the ultrasonic acoustical pressure waves back to the original audio signal. The ultrasonic speech translator and communication system includes an ultrasonic transmitting device and an ultrasonic receiving device. The ultrasonic transmitting device accepts as input an audio signal such as human voice input from a microphone or tape deck. The ultrasonic transmitting device frequency modulates an ultrasonic carrier signal with the audio signal producing a frequency modulated ultrasonic carrier signal, which is transmitted via acoustical pressure waves across a carrier medium such as gases, liquids or solids. The ultrasonic receiving device converts the frequency modulated ultrasonic acoustical pressure waves to a frequency modulated electronic signal, demodulates the audio signal from the ultrasonic carrier signal, and conditions the demodulated audio signal to reproduce the original audio signal at its output.

A FOURTH EXAMPLE, U.S. Pat. No. 5,661,699 to Sutton teaches an acoustic communication system that comprises: a voice processing circuit which generates a first signal representing a voice message; a noise sensor channel which generates a second signal in response to detecting background noise in an environment; a microcomputer which receives the first and second signals, and provides a third signal to a selected one of first and second output ports of the microcomputer, where the amplitude of the third signal is functionally related to the value of the second signal; an ultrasonic output channel coupled to the first output port and which generates an ultrasonic output signal representing the voice message in response to receiving the third signal; a public address channel coupled to the second output port which generates an audible signal representing the voice message in response to receiving the third signal; and an ultrasonic receiving system which generates an audible output representing the voice message in response to receiving the ultrasonic output signal.

It is apparent that numerous innovations for communication systems have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a portable and hand-held device for detecting, and making humanly audible, ultrasonic sounds that avoids the disadvantages of the prior art.

ANOTHER OBJECT of the present invention is to provide a portable and hand-held device for detecting, and making humanly audible, ultrasonic sounds that is simple and inexpensive to manufacture.

STILL ANOTHER OBJECT of the present invention is to provide a portable and hand-held device for detecting, and making humanly audible, ultrasonic sounds that is simple to use.

BRIEFLY STATED, STILL YET ANOTHER OBJECT of the present invention is to provide a portable and hand-held device for detecting, and making humanly audible, ultrasonic sounds. The device includes a hand-held housing and circuitry that is contained in the housing. The circuitry includes a microphone that receives the ultrasonic sound, a first low voltage audio power amplifier that strengthens the signal from the microphone, a second low voltage audio power amplifier that further strengthens the signal from the first low voltage audio power amplifier, a 7-stage ripple carry binary counter that lowers the frequency of the signal from the second low voltage audio power amplifier so as to be humanly audible, a third low voltage audio power amplifier that strengthens the signal from the 7-stage ripple carry binary counter, and a speaker that generates a humanly audible sound from the third low voltage audio power amplifier.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows.

Figure 1:
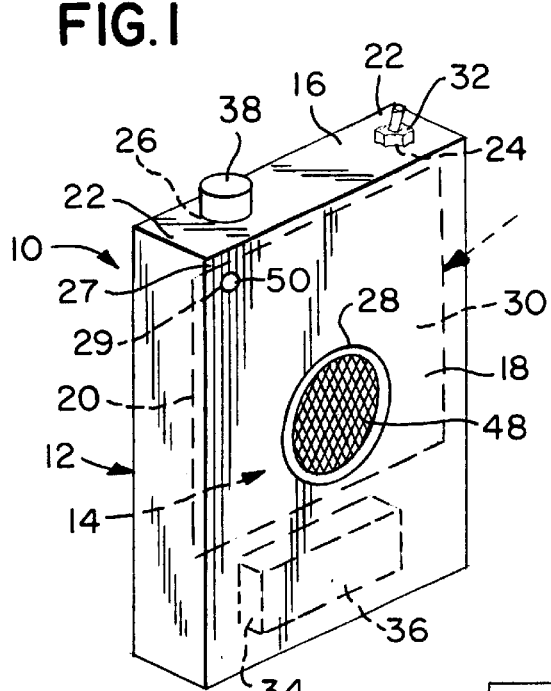
FIG. 1 is a diagrammatic perspective view of the present invention.

LIST OF REFERENCE NUMERALS UTILIZED IN THE DRAWING 10 portable and hand-held device of present invention for making humanly audible sounds responsive to the detecting of ultrasonic sounds
12 housing for being portable and hand-held
14 circuitry for detecting, and making humanly audible, ultrasonic sounds
16 top wall of housing 12
18 front wall of housing 12
20 chamber contained in housing 12
22 pair of ends of top wall 16 of housing 12
24 switch throughbore through one end of pair of ends 22 of housing 12
26 microphone throughbore through other end of pair of ends 22 of housing 12
27 upper corner of front wall 18 of housing 12
28 speaker throughbore centrally through front wall 18 of housing 12
29 audio jack throughbore through upper corner 27 of front wall 18 of housing 12
30 PC board of circuitry 14
32 power switch of circuitry 14
34 power interface of circuitry 14 for interfacing with power source 36
36 power source
38 microphone of circuitry 14 for receiving ultrasonic sound that is not humanly audible
40 first low voltage audio power amplifier of circuitry 14
42 second low voltage audio power amplifier of circuitry 14
44 7-stage ripple carry binary counter of circuitry 14
46 third low voltage audio power amplifier of circuitry 14
48 speaker of circuitry 14
50 audio output jack of circuitry 14
52 first capacitor of circuitry 14
54 second capacitor of circuitry 14
56 third capacitor of circuitry 14
58 fourth capacitor of circuitry 14

DETAILED DESCRIPTION OF THE PREFERRED EMBODIMENT

Referring now to the figures, in which like numerals indicate like parts, and particularly to FIG. 1, the portable and hand-held device of the present invention is shown generally at 10 for making humanly audible sounds responsive to the detecting of ultrasonic sounds.

The overall configuration of the portable and hand-held device 10 can best be seen in FIG. 1, and as such, will be discussed with reference thereto.

The portable and hand-held device 10 comprises a housing 12 for being portable and hand-held, and circuitry 14 that is contained in the housing 12 for making humanly audible sounds responsive to the detecting of ultrasonic sounds.

The configuration of the housing 12 can best be seen in FIG. 1, and as such, will be discussed with reference thereto.

The housing 12 is rectangular-parallelepiped-shaped, and has a top wall 16, a front wall 18, and contains a chamber 20.

The top wall 16 of the housing 12 has a pair of ends 22 and a switch throughbore 24 that is disposed through one end 22 thereof, and which communicates with the chamber 20 in the housing 12.

The top wall 16 of the housing 12 further has a microphone throughbore 26 that is disposed through the other end 22 thereof, and which communicates with the chamber 20 in the housing 12.

The front wall 18 of the housing 12 has an upper corner 27 and a speaker throughbore 28 that is disposed centrally therethrough, and which communicates with the chamber 20 in the housing 12.

The front wall 18 of the housing 12 further has an audio jack throughbore 29 that is disposed through the upper corner 27 thereof, and which communicates with the chamber 20 in the housing 12.

Figure 2:
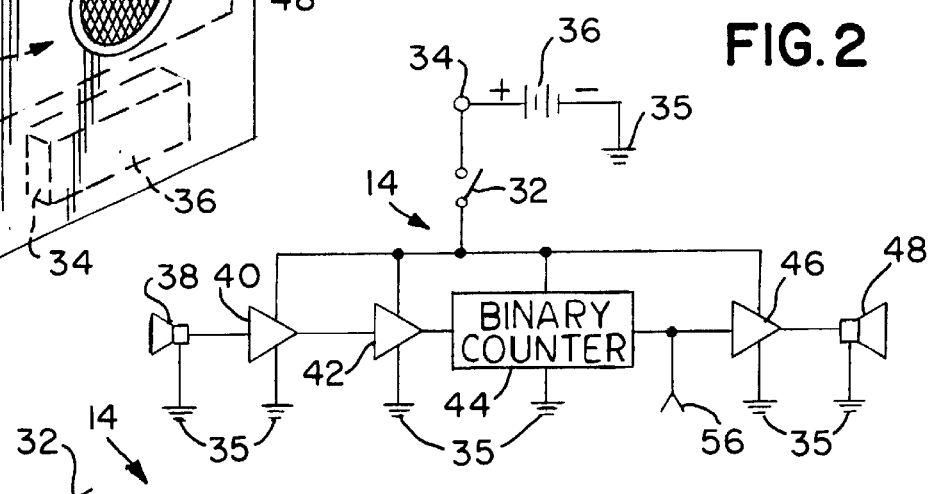
FIG. 2 is a block diagram of the circuitry of the present invention.
Figure 3:
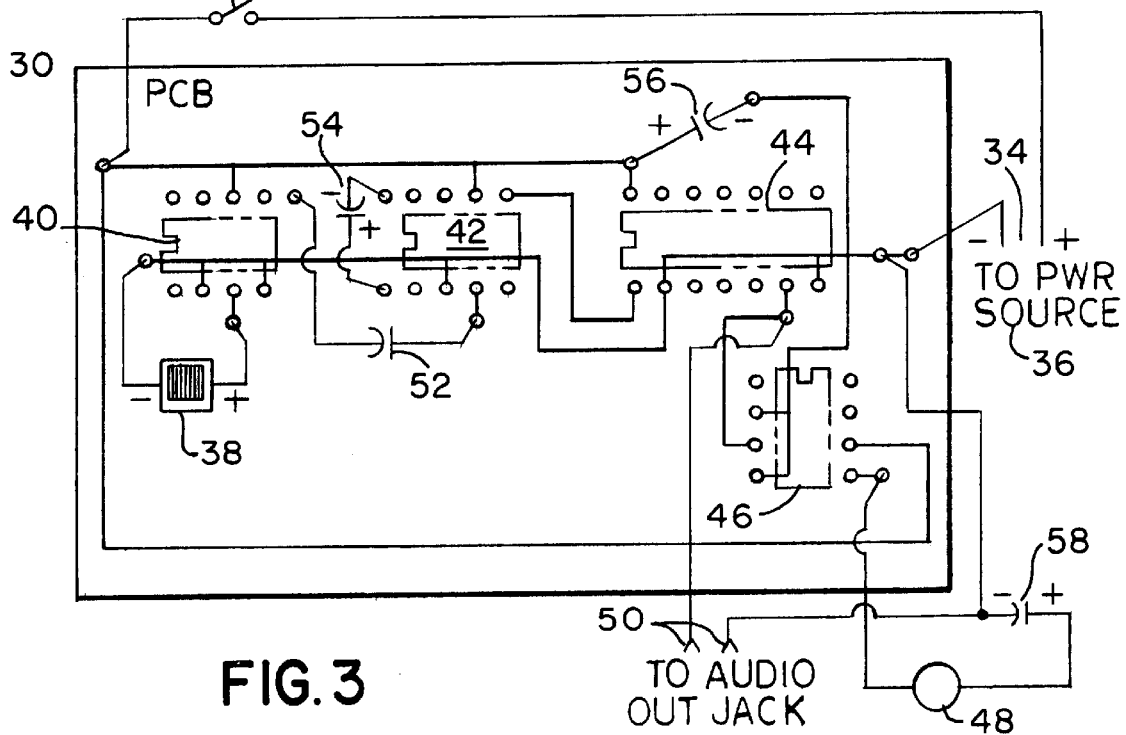
FIG. 3 is a schematic diagram of the circuitry of the present invention.

The circuitry 14 can best be seen in FIGS. 1–3, and as such, will be discussed with reference thereto.

The circuitry 14 is contained in the chamber 20 in the housing 12.

The circuitry 14 comprises a PC board 30 that is contained in the chamber 20 in the housing 12.

The circuitry 14 further comprises a power switch 32 that extends in the switch throughbore 24 in the top wall 16 of the housing 12 for allowing a user to operate the power switch 32 with the thumb while the housing 12 is held in the palm of the hand, and which selectively turns the circuitry 14 on and off.

The circuitry 14 further comprises a power interface 34 that is in electrical communication with the power switch 32 and ground 35 for interfacing with a power source 36, with the power source being a 9 to 12 volt DC battery, preferably a 9 volt DC battery.

The circuitry 14 further comprises a microphone 38 that extends in the microphone throughbore 26 in the top wall 16 of the housing 12 for allowing the user to point the microphone 38 at a target while the housing 12 is held in the palm of the hand and the power switch 32 is operated by the thumb of the user, is in electrical communication with the ground 35, and is for receiving the ultrasonic sound that is not humanly audible, and in response thereto, generates a signal.

The circuitry 14 further comprises a first low voltage audio power amplifier 40 that is disposed on the PC board 30, is in electrical communication with the ground 35, the power switch 32, and the microphone 38, and receives the signal from the microphone 38, and in response thereto, generates a strengthened signal.

A typical first low voltage audio power amplifier 40 is sold under part number LM386 by the National Semiconductor Corporation.

The part number LM386 is a power amplifier designed for use in low voltage consumer application. The gain is internally set to 20 to keep external part count low, but the addition of an external resister and capacitor between pins 1 and 8 will increase the gain to any value up to 200. The inputs are ground referenced while the output is automatically biased to one half the supply voltage. The quiescent power drain is only 24 milliwatts when operating from a 6 volt supply, making the LM386 ideal for battery operation.

The data sheet for the LM386 is included herewith and is to be incorporated herein by reference thereto.

The circuitry 14 further comprises a second low voltage audio power amplifier 42 that is disposed on the PC board 30, is in electrical communication with the first low voltage audio power amplifier 40, the ground 35, and the power switch 32, and receives the strengthened signal from the first low voltage audio power amplifier 40, and in response thereto, generates a further strengthened signal.

A typical second low voltage audio power amplifier 42 is sold under part number LM386 by the National Semiconductor Corporation and discussed supra.

The circuitry 14 further comprises a 7-stage ripple carry binary counter 44 that is disposed on the PC board 30, is in electrical communication with the second low voltage audio power amplifier 42, the ground 35, and the power switch 32, and receives the further strengthened signal from the second low voltage audio power amplifier 42, and in response thereto, generates a lowered frequency signal that is humanly audible.

A typical 7-stage ripple-carry binary counter 44 is sold under part number CD4024BC by the National Semiconductor Corporation.

The CD4024BC is reset to its logical "0" stage by a logical "1" on the reset input. The counter is advanced one count on the negative transition of each clock pulse. Buffered outputs are externally available from stages 1 through 7.

The data sheet for the CD4024BC is included herewith and is to be incorporated herein by reference thereto.

The circuitry 14 further comprises a third low voltage audio power amplifier 46 that is disposed on the PC board 30, is in electrical communication with the 7-stage ripple-carry binary counter 44, the ground 35, and the power switch 32, and receives the lowered frequency signal that is humanly audible from the 7-stage ripple-carry binary counter 44, and in response thereto, generates a strengthened signal that is humanly audible.

A typical third low voltage audio power amplifier 46 is sold under part number LM386 by the National Semiconductor Corporation and discussed supra.

The circuitry 14 further comprises a speaker 48 that extends in the speaker throughbore 28 in the front wall 18 of the housing 12 for allowing the user to listen while pointing the microphone 48 at the target while the housing 12 is held in the palm of the hand and the power switch 32 is operated by the thumb of the user, is in electrical communication with the third low voltage audio power amplifier 46 and the ground 35, and receives the strengthened signal that is humanly audible from the third low voltage audio power amplifier 46, and in response thereto, generates a humanly audible sound.

The speaker 48 is a transducer that has a sound frequency range which spans from 20 hertz to 40 kilohertz.

The circuitry 14 further comprises an audio output jack 50 that extends in the audio jack throughbore 29 in the front wall 18 of the housing 12, is in electrical communication with the 7-stage ripple-carry binary counter 44, prior to the third low voltage audio power amplifier 46, and receives the lowered frequency signal that is humanly audible from the 7-stage ripple-carry binary counter 44, and in response thereto, makes the lowered frequency signal that is humanly audible available for recording and future analysis.

The audio output jack 50 is high impedance.

The circuitry 14 further comprises a first capacitor 52 that is in electrical communication with the first low voltage audio power amplifier 40 and the second low voltage audio power amplifier 42.

The first capacitor 52 is rated at 0.047 $\mu f$.

The circuitry 14 further comprises a second capacitor 54 that electrically communicates across the second low voltage audio power amplifier 42.

The second capacitor 54 is rated at 10 $\mu f$.

The circuitry 14 further comprises a third capacitor 56 that is in electrical communication with the 7-stage ripple-carry binary counter 44 and the third low voltage audio power amplifier 46.

The third capacitor 56 is rated at 470 $\mu f$.

The circuitry 14 further comprises a fourth capacitor 58 that is in electrical communication with the 7-stage ripple-carry binary counter 44 and the speaker 48.

The fourth capacitor 58 is rated at 470 $\mu f$.

It will be understood that each of the elements described above, or two or more together, may also find a useful application in other types of constructions differing from the types described above.

While the invention has been illustrated and described as embodied in a portable and hand-held device for detecting, and making humanly audible, ultrasonic sounds, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A portable and hand-held device for making humanly audible sounds responsive to the detecting of ultrasonic sounds, said device comprising:
   a) a housing for being portable and hand-held; and
   b) circuitry contained in said housing for detecting, and making humanly audible, the ultrasonic sounds, wherein said housing is rectangular-parallelepiped-shaped, contains a chamber, and has:
   i) a top wall; and
   ii) a front wall, wherein said top wall of said housing has:
      A) a pair of ends; and
      B) a switch throughbore that is disposed through one end thereof, and which communicates with said chamber in said housing, wherein said top wall of said housing further has a microphone throughbore that is disposed through the other end thereof, and which communicates with said chamber in said housing, wherein said front wall of said housing has:

I) an upper corner; and
II) a speaker throughbore that is disposed centrally therethrough, and which communicates with said chamber in said housing, wherein said front wall of said housing further has an audio jack throughbore that is disposed through said upper corner thereof, and which communicates with said chamber in said housing, wherein said circuitry is contained in said chamber in said housing, wherein said circuitry comprises a PC board that is contained in said chamber in said housing, wherein said circuitry further comprises a power switch that extends in said switch throughbore in said top wall of said housing for allowing a user to operate said power switch with the thumb while said housing is held in the palm of the hand, and which selectively turns said circuitry on and off, wherein said circuitry further comprises a power interface that is in electrical communication with said power switch and ground for interfacing with a battery power source, wherein said circuitry further comprises a microphone that extends in said microphone throughbore in said top wall of said housing for allowing the user to point said microphone at a target while said housing is held in the palm of the hand and said power switch is operated by the thumb of the user, is in electrical communication with said ground, and is for receiving the ultrasonic sound that is not humanly audible, and in response thereto, generates a signal, wherein said circuitry further comprises a first low voltage audio power amplifier that is disposed on said PC board, is in electrical communication with said ground, said power switch, and said microphone, and receives said signal from said microphone, and in response thereto, generates a strengthened signal, wherein said circuitry further comprises a second low voltage audio power amplifier that is disposed on said PC board, is in electrical communication with said first low voltage audio power amplifier, said ground, and said power switch, and receives said strengthened signal from said first low voltage audio power amplifier, and in response thereto, generates a further strengthened signal.

2. The device as defined in claim 1, wherein said circuitry further comprises a 7-stage ripple carry binary counter that is disposed on said PC board, is in electrical communication with said second low voltage audio power amplifier, said ground, and said power switch, and receives said further strengthened signal from said second low voltage audio power amplifier, and in response thereto, generates a lowered frequency signal that is humanly audible.

3. The device as defined in claim 2, wherein said circuitry further comprises a third low voltage audio power amplifier that is disposed on said PC board, is in electrical communication with said 7-stage ripple-carry binary counter, said ground, and said power switch, and receives said lowered frequency signal that is humanly audible from said 7-stage ripple-carry binary counter, and in response thereto, generates a strengthened signal that is humanly audible.

4. The device as defined in claim 3, wherein said circuitry further comprises a speaker that extends in said speaker throughbore in said front wall of said housing for allowing the user to listen while pointing said microphone at the target while said housing is held in the palm of the hand and said power switch is operated by the thumb of the user, is in electrical communication with said third low voltage audio power amplifier and said ground, and receives said strengthened signal that is humanly audible from said third low voltage audio power amplifier, and in response thereto, generates a humanly audible sound.

5. The device as defined in claim 4, wherein said speaker is an ultrasonic that has a sound frequency range which spans from 20 hertz to 40 kilohertz.

6. The device as defined in claim 3, wherein said circuitry further comprises an audio output jack that extends in said audio jack throughbore in said front wall of said housing, is in electrical communication with said 7-stage ripple-carry binary counter, prior to said third low voltage audio power amplifier, and receives said lowered frequency signal that is humanly audible from said 7-stage ripple-carry binary counter, and in response thereto, makes said lowered frequency signal that is humanly audible available for recording and future analysis.

7. The device as defined in claim 6, wherein said audio output jack is high impedance.

8. The device as defined in claim 1, wherein said circuitry further comprises a first capacitor that is in electrical communication with said first low voltage audio power amplifier and said second low voltage audio power amplifier.

9. The device as defined in claim 8, wherein said first capacitor is rated at 0.047 µf.

10. The device as defined in claim 1, wherein said circuitry further comprises a second capacitor that electrically communicates across said second low voltage audio power amplifier.

11. The device as defined in claim 10, wherein said second capacitor is rated at 10 µf.

12. The device as defined in claim 3, wherein said circuitry further comprises a third capacitor that is in electrical communication with said 7-stage ripple-carry binary counter and said third low voltage audio power amplifier.

13. The device as defined in claim 12, wherein said third capacitor is rated at 470 µf.

14. The device as defined in claim 4, wherein said circuitry further comprises a fourth capacitor that is in electrical communication with said 7-stage ripple-carry binary counter and said speaker.

15. The device as defined in claim 14, wherein said fourth capacitor is rated at 470 µf.

* * * * *